United States Patent [19]
Bschorr

[11] 4,399,851
[45] Aug. 23, 1983

[54] WHEEL TIRE WITH NOISE ABSORBING MEANS

[75] Inventor: Oskar Bschorr, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 255,245

[22] Filed: Apr. 17, 1981

[30] Foreign Application Priority Data

Apr. 26, 1980 [DE] Fed. Rep. of Germany ....... 3016255

[51] Int. Cl.³ .................. B60C 13/00; B60C 5/00; B60C 7/00; B60C 9/00
[52] U.S. Cl. .................................... 152/156; 152/157; 152/165; 152/301; 152/302; 152/310; 152/339; 152/349; 152/353 C; 152/360; 152/374; 181/208; 295/7; 295/9 A; 295/31 A
[58] Field of Search .............. 152/156, 158, 165, 197, 152/198, 199, 200, 330 R, 330 RF, 339, 355, 353 R, 360, 354 R, 374, 347, 157, 166, 195, 342, 247, 270, 301, 302, 310, 325, 349, 350, 353 C, 362 R; 181/207, 208, 209; 295/7, 8, 9 A, 31 A; 105/452; 74/443, 574; 244/103 R

[56] References Cited

U.S. PATENT DOCUMENTS

| 483,493 | 9/1892 | Hicks | 152/156 X |
| 1,874,197 | 8/1932 | Lang | 152/347 |
| 2,902,072 | 9/1959 | Reuter | 152/330 R |
| 3,010,504 | 11/1961 | Polhemus | 152/156 X |
| 3,238,988 | 3/1966 | Roque | 152/156 |
| 4,091,856 | 5/1978 | Jackson | 152/374 X |
| 4,168,732 | 9/1979 | Monzini | 152/353 R |
| 4,295,984 | 10/1981 | Lochner | 181/294 |

Primary Examiner—William A. Powell
Assistant Examiner—Thomas Bokan
Attorney, Agent, or Firm—W. G. Fasse; D. H. Kane, Jr.

[57] ABSTRACT

The running characteristics of a tire for a wheel are improved to provide a more quiet run, by attaching to an inner and/or outer surface of the tire vibration absorbing elements. Vibration absorbing elements may even be inserted into the tire material itself. The vibration absorbing elements are secured to the tire surface in a force and moment or torque transmitting manner by vulcanization or by a suitable adhesive. A strap may hold the individual absorbing elements together or the elements may form integral parts of the strap which is secured to the tire surface, for example, by a rubber vulcanizing operation. The vibration absorber elements may be secured to an inner tube instead of to the tire.

13 Claims, 16 Drawing Figures

WHEEL TIRE WITH NOISE ABSORBING MEANS

CROSS-REFERENCE TO RELATED APPLICATION

The present invention is based on corresponding German Ser. No. P 30 16 255.1 filed in the Federal Republic of Germany on Apr. 26, 1980. The priority of the German filing date is claimed for the present application.

BACKGROUND OF THE INVENTION

This invention relates to a wheel tire adapted to be filled with a gas under pressure. Such tires are widely used for vehicles and on the landing gear of aircraft.

Such tires have a tendency to radiate noise, especially at higher speeds. Such noise frequently amounts to a nuisance and is considered an acoustical pollution which the manufacturer wants to reduce. The noise radiation is caused primarily by body sound vibrations which in turn are caused by an uneven surface on which the tire rolls and by the segmented tire profile itself. These body sound vibrations cause a secondary air noise radiation. In addition to the air noise radiation, a rolling tire causes noise due to the so-called air pumping occurring at the contact area between the tire tread and the road or runway surface. However, the air pumping is of minor significance compared to the air noise radiation.

Prior art efforts to suppress tire noise have been directed primarily to the formation of the tire profile and to the selection of special rubber mixtures. For avoiding air pumping, the tire profile was made to form an open pattern for avoiding the trapping of air. It has also been suggested to use an uneven tire profile division around the tire circumference in order to eliminate troublesome resonance conditions. However, uneven tire profile divisions achieved only a relatively small, partial success. This applies as well to the use of damping rubber mixtures for making tires. The loss factor of such damping rubber mixtures for converting noise or sound energy into heat is limited. Further, it is difficult to match a damping rubber mixture in a damping sense to the relatively stiff carcass of the tire which forms part of the force flow. Thus, the results of prior art efforts to reduce tire noise radiation have not yet been entirely satisfactory.

OBJECTS OF THE INVENTION

In view of the above, it is the aim of the invention to achieve the following objects singly or in combination:

to achieve an effective reduction of the noise radiating tire vibrations, especially of gas filled tires;

to connect a vibration absorber to a tire in a load transmitting manner, that is, in a force and torque or moment transmitting manner for optimizing the transfer of noise energy from the tire into the vibration absorber;

to concentrate on the damping of the higher frequencies in the noise spectrum of tire vibrations thus avoiding an increase in the rolling resistance of the tire which occurs if the low tire vibrations are damped;

to minimize the exposure of the noise absorbing means to wear and tear; and to concentrate vibration damping to a frequency range which is most bothersome, namely in the range starting approximately at about 1000 Hz.

SUMMARY OF THE INVENTION

The noise generated by a wheel tire, especially a wheel tire filled with a pressurized gas, is reduced according to the invention, by vibration absorber means connected to the tire in a force and moment or torque transmitting manner. The vibration absorber may be connected to an inner tube, instead. The vibration absorber means according to the invention may be provided in the form of a wave guide having a diminishing cross-section or a diminishing density from one end to the other whereby the end of larger diameter or larger density is attached to the vibrating body for taking up noise energy from the vibrating body and to transform such noise energy into heat while simultaneously avoiding reflections back into the vibrating body such as a tire. To optimize the transfer of noise energy from the tire into the absorber, the latter is connected in a force and torque or moment transmitting manner to the tire, for example, by an adhesive bond.

The use of vibration absorbers as taught herein is especially advantageous because these absorbers have a wide band damping spectrum which begins above a certain cut-off frequency and which is substantially constant above said cut-off frequency which may be selected or influenced by properly selecting the dimensions of the absorber. Thus, lower frequencies such as those resulting from air pumping are not damped according to the invention. This is desirable because damping the lower fulling frequencies increases the rolling resistance of the tire. Due to the above mentioned damping characteristic, the present absorbers are especially suited for damping tire vibrations in the range starting at about 1 kHz and reaching to about 2 kHz.

Basically, the present vibration absorbers may be secured to any portion of a tire, except for the outer tread surface. It is, however, preferable to install the absorbers inside the tire because this protects the absorbers against direct wear and tear by shocks and friction and also against weather conditions. Within a tire, the absorbers are preferably secured, for example, glued, to the inwardly facing surface of the tire tread portion which has the advantage that the absorbers are located as close as possible to the source of noise generation. Further, attaching the vibration absorber means directly to the inner surface of the tread portion increases the input impedance of the tire whereby less vibration energy is introduced into the tire as compared to a tire without such absorbers.

However, it is also possible to secure the absorbers to the inner surfaces of the tire side walls. It has been found that the noise or sound radiation by the tire side walls may be effectively reduced by relatively small auxiliary vibration absorbing or damping means secured to the inner side wall surface of the tire because the local impedance of the tire side walls is reduced due to the smaller mass distribution on the tire side walls, as compared to the tire tread portion.

The present vibration absorber means may be produced in the form of individual absorber elements having, for example, a pyramid or cone shape secured to any inner and/or outer surface portion of a tire, except the outer tread surface. The absorbers, in another embodiment, may have a longitudinal configuration whereby the respective longitudinal axis would extend in the direction in which a tire rolls or runs. Where the absorbers are secured to the inner surface of the tread portion of the tire, it may be practical or suitable that the noise absorbers are arranged to follow substantially along the grooves of the tire profile. In another embodiment, the absorbers are arranged to extend at least partially across the tire running direction, whereby again the absorbers may follow the grooves in the tire profile.

The invention further teaches to incorporate damping inserts or platelets either into the vibration absorbers or directly into the tire material. These damping inserts or damping platelets comprise elastic strands, fiber sections or elastic platelets. Preferably, these elastic elements are themselves embedded in a layer of damping material. The damping strands embedded in the vibration absorbers preferably extend in the direction toward the narrower end of the respective absorber and are so arranged as to provide an absorber which is free of reflections or which is provided with a nonreflecting termination. Similarly, damping layers attached to the surface of the vibration absorbers may be arranged to provide a non-reflecting termination of the respective absorber.

The damping strands embedded in a damping material which is directly enclosed in the tire material also have a vibration damping effect. In both instances, where the damping means are enclosed in the vibration absorber or in the tire material, the vibration damping effect is due to the fact that between the elastic elements and the surrounding damping material, friction forces occur whereby the vibration energy is transformed into heat energy. The foregoing also applies to elastic platelets embedded in a damping material. Metal wire, textile fibers, metal platelets and the like may be used for the present purposes. The damping layer may be made of high polymers, pastes or solid type lubricants, such as graphite or molybdenum sulfide.

It has been found that an optimal damping is achieved if the damping layer has an imaginary shear modulus G and if the following condition is substantially satisfied:

$$1 = 2EHS/(G''\cdot L^2 \cdot U); \quad (G = iG'')$$

wherein E is the modulus of elasticity of the elastic strands or platelets, L is the length of the strands or platelets, S is the cross-sectional surface of the strands or platelets, U is the circumference of the strands or platelets, wherein H is the thickness of the damping layer measured from the surface of the strands or platelets, and wherein "i" is the imaginary unit. These equations shall be valid for the relevant noise range of about 1000 Hz to 2000 Hz.

BRIEF FIGURE DESCRIPTION

In order that the invention may be clearly understood, it will now be described, by way of example, with reference to the accompanying drawings, wherein:

FIG. 8b is a sectional view along section line 8b—8b in FIG. 8a;

FIG. 9b is a sectional view along section line 9b—9b in FIG. 9a;

DETAILED DESCRIPTION OF PREFERRED EXAMPLE EMBODIMENTS AND OF THE BEST MODE OF THE INVENTION

Figure 1:
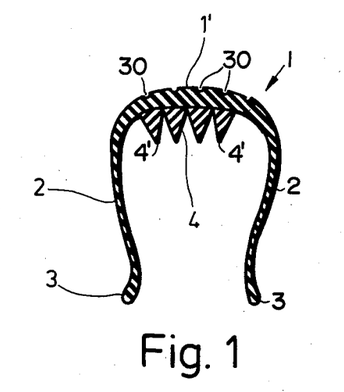
FIG. 1 is a sectional view through a tire provided with vibration absorbers according to the invention in the form of absorber elements having a triangular cross-section, and wherein the illustration is simplified by omitting the three-dimensional features of the tire and of the absorber means.

A tire 1 for a wheel is shown in FIGS. 1–7 and 10. The structure of the tire is conventional and the tire will normally be filled with a gas under pressure, such as air, when the tire is secured to a wheel. The tire 1 comprises a radially outwardly facing tread surface 1', side walls 2, and a tire rim 3. In FIG. 1, the vibration absorber means 4 have a substantially triangular or cone shaped cross-section and are provided in the form of bands or strips secured to the inwardly facing surface of the tire opposite the tread 1'. The tire tread surface is, for example, provided with circumferential grooves 30 and it will be noted that the vibration absorber means 4 are arranged substantially opposite a tire profile groove 30. The lines defining the sides of the triangular cross-sectional shapes of an absorber 4 may be straight lines or they may be curved whereby one side of the triangle is secured to the inwardly facing surface of the tire. The securing may be accomplished by a conventional adhesive or by vulcanization. The triangular cross-section of the absorber 4 may extend all the way around the tire without any interruption thereby forming absorber strips 4. In another embodiment, the triangular cross-sections may represent separate cones or pyramids secured to the inner surface of the tire in a row or rows.

The vibration absorbers may be made of rubber, synthetic material, or any other suitable material. The vibration absorbers may have embedded therein damping inserts to be described in more detail below. Further, the vibration absorbers may be covered with damping layers, especially at their tapering ends, said damping layers having a high loss factor. As mentioned above, the tips 4' of the vibration absorbers 4 are preferably so located as to follow the grooves 30 in the tread surface 1' of the tire. Thus, these tips 4' are arranged substantially opposite the grooves 30.

Figure 2:
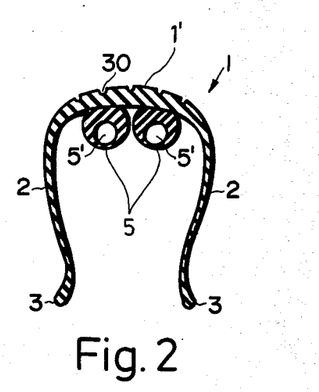
FIG. 2 is a view similar to that of FIG. 1, however showing the vibration absorber means in the form of hollow tubular members.

FIG. 2 shows a tire which is provided on its inside with two tubular vibration absorbers 5. These absorbers have a cross-sectional area corresponding substantially to a circle or to an ellipsis whereby the hollow channel 5' is located off-center relative to the longitudinal central axis of the vibration absorber. The arrangement is such that the first thicker portions of each absorber 5 are secured to the inner surface of the tire, for example, opposite the tread. The off-center location of the channel 5' also provides second portions of diminishing thickness tapering away from the first portion. The type of absorber shown in FIG. 2 in tubular form extends entirely along the inner circumference of the tire without any interruption. Due to the off-center location of the channels 5', it is possible to connect a sufficient width of the absorbers 5 with the inner surface of the tire whereby the cross-sectional surface area diminishes in both directions around each central channel 5' to the line farthest away from the area of contact between the absorber 5 and the inner tire surface.

Figure 3:
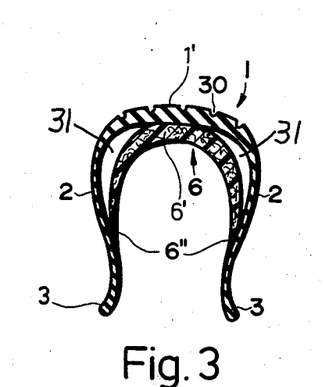
FIG. 3 shows that the vibration absorber means have the shape of a sickle.

FIG. 3 illustrates a vibration absorber 6 having a cross-sectional area corresponding approximately to the shape of a sickle whereby the widest central portion 6' of the absorber 6 again is connected in a force and torque or moment transmitting manner to the inner tire surface opposite the tread 1'. The tapering sickle tips 6" are connected to the inner surfaces of the tire side walls 2 whereby these tips 6" point toward the tire rims 3. The absorber 6 again extends along the entire inner circumference of the tire. The mentioned connection of the sickle tips 6" to the inner surfaces of the tire side walls results in a more stable tire. Just as the absorbers 4 and 5, the absorbers 6 may also be made of synthetic material, synthetic material reinforced with textile fibers or of rubber. Any other suitable material could also be used.

Figure 4:
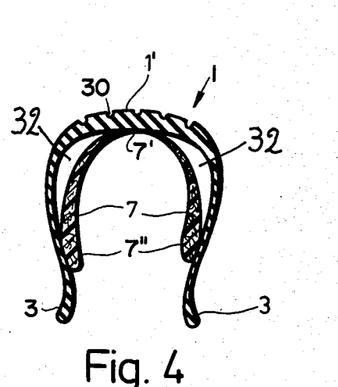
FIG. 4 shows that the vibration absorber means have the shape of two half sickles meeting each other at the tip of the sickles.

FIG. 4 illustrates an embodiment in which the vibration absorber 7 has the shape of a horseshoe with a thin central portion 7' and two thickened end portions 7". Thus, the cross-section of the absorber 7 resembles two half sickles which are connected to each other at their tips 7' to the tire. The thickened ends 7" also connected to the inner surfaces of the tire side walls, whereby the thickened ends 7" point toward the tire rims 3. The materials for making the absorbers 7 are the same as mentioned above.

The special advantage of the embodiments shown in FIGS. 3 and 4 is seen in that in addition to the noise or sound absorption, the noise damping is amplified because the tire side walls practically are constructed as double walls as shown by the air pockets 31 and 32 in FIGS. 3 and 4.

Figure 5:
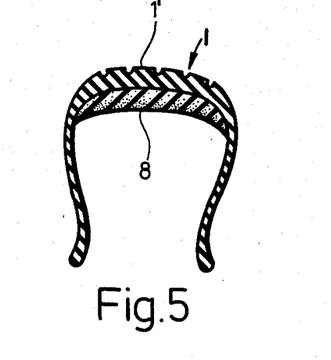
FIG. 5 shows a cross-section in which the vibration absorber means have a contour corresponding to the inner tire surface adjacent to the tread portion thereof.
Figure 6:
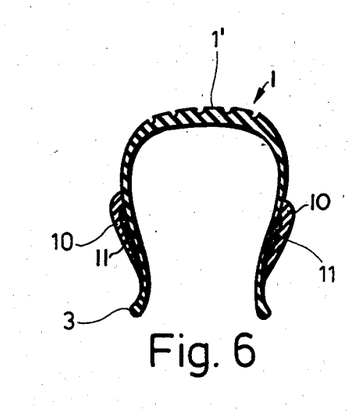
FIG. 6 shows a sectional view in which the vibration absorber means and additional damping means are secured to the outer side walls of the tire.
Figure 7:
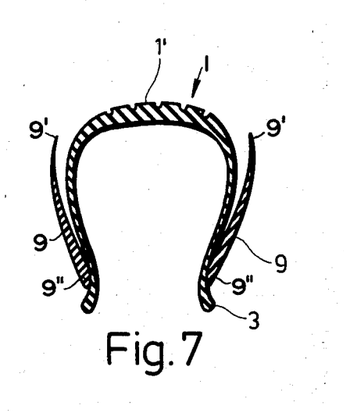
FIG. 7 shows the vibration absorber means attached to the outer side walls of the tire along one ring-type surface portion.

FIG. 5 shows an embodiment in which the vibration absorber 8 is made of a foam type material which has a varying porosity so that the material is more porous in layers farther away from the inner tire surface than in layers which are closer to the inner tire surface. In other words, said varying porosity is achieved by using several layers each having a different porisity. Accordingly, the density decreases in the direction away from the inner tire surface radially inwardly. This feature of an increasing porosity or decreasing density radially inwardly has the same effect as, for example, the tapering radially inwardly shown in FIG. 1 or the hollow channels 5' in FIG. 2. Foam rubber or a porous synthetic material is suitable for making the vibration absorber 8. This type of structure further causes a damping of air noise within the tire itself. In FIGS. 6 and 7, the vibration absorbers are secured to the outer surfaces of the tire side walls. In these embodiments, the vibration absorbers basically form circular ring-shaped plates. However, the purposes of the invention may also be accomplished by providing the absorbers in the form of circular ring segment or sector-type plates.

FIG. 6 shows vibration absorbers 10 having a thicker end located radially outwardly and a thinner end pointing toward the tire rim. Both ends are secured to the outer side wall surface of the tire by adhesive or similar means to form a hollow space which is filled with a damping layer 11 which is connected to the tire surface and to the inwardly facing surface of the respective vibration absorber 10. The damping layer 11 is made of foam rubber or a foam type synthetic material. The damping layer 11 is capable to take up vibrations from the vibration absorbers and to convert the vibration energy into heat energy whereby the absorbed vibrations are damped in a reflection free manner. As mentioned, the pointed tips of the absorbers 10 are also secured to the tire to strengthen the entire structure.

FIG. 7 shows vibration absorbers 9 with tipped ends 9' and thick ends 9". The thick ends 9" are rigidly secured to the outer side wall surface of the tire in a force and moment or torque transmitting manner. The tipped ends 9' point radially outwardly and are somewhat bent axially inwardly toward the tread surface 1'. However, the plates forming the absorbers 9 are sufficiently stiff so that even at high r.p.m.s, the tips 9' will remain spaced from the surface of the tire side walls. The vibration absorbers 9 may also be made of textile fiber reinforced rubber whereby damping strands may be enclosed in the textile reinforced rubber to extend in the radial direction. The above mentioned spacing between the absorbers 9 and the tire side walls radially outwardly has the advantage that the absorbers act as a noise screen for the noise or sound that emanates from the tire side walls.

Figures 8A, 9A:
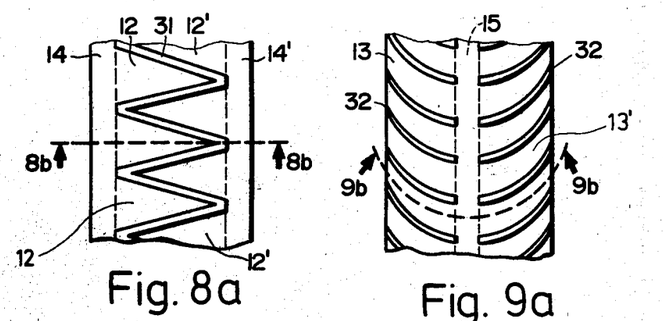
FIG. 8a shows a top plan view of a band-type vibration absorber according to the invention.
FIG. 9a is a top plan view onto a different type of vibration absorber according to the invention.
Figure 8B:
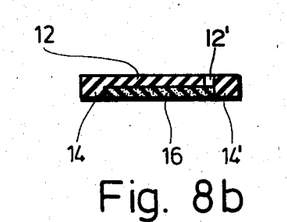
Figure 9B:
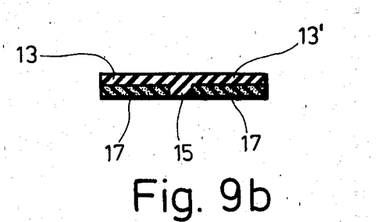

FIG. 8a shows a top plan view of a vibration absorber according to the invention which comprises individual absorber elements 12 forming an integral part of, or being secured to, a strap 14. Similarly, further absorber elements 12' are secured to or form an integral part of a strap 14'. The two straps with their absorber elements face each other so that a small gap 31 is formed between respective adjacent absorber elements. The straps 14, 14' are secured to the tire surface either inside the tire or outside the tire and a noise damping material 16 is interposed between the tire surface and the absorber element 12, 12', as best seen in FIG. 8b. The damping layer 16 of foam material is connected in a force and moment transmitting manner to the tire surface as well as to the elements 12, 12' whereby a reflection free termination is accomplished and any noise or sound waves entering into the relatively flat elements 12, 12' are damped without any reflection. FIGS. 9a and 9b show a structure similar to that of 8a and 8b; however, the absorber elements 13 and 13' have a bent, half-sickle type of structure and are secured to a common strap 15 which in turn is secured to the inner or outer surface of the tire. Gaps 32 remain between adjacent absorber elements 13 and 13'. A noise damping layer 17 is arranged between the tire surface and the absorber elements 13, 13'. The damping layer 17 is secured to the tire and to the elements 13, 13', thereby providing a reflection free termination as described above.

Figure 10:
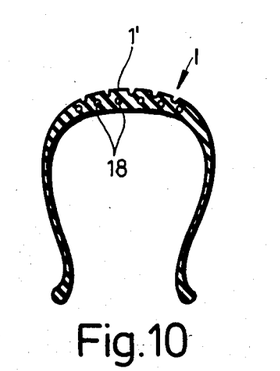
FIG. 10 is a schematic sectional view through a tire in which the damping material is enclosed directly in channels of the tire material.
Figures 11, 12, 13:
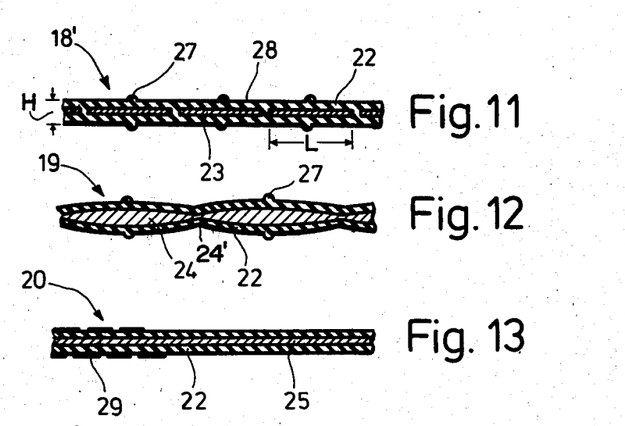
FIG. 11 shows a sectional view through a vibration absorber means in the form of strand sections embedded in damping material.
FIG. 12 is a view similar to that of FIG. 11 with the modification that the elastic strand sections have been replaced by an elastic strand of varying cross-sectional size along its length.
FIG. 13 is a view similar to that of FIG. 12, however showing an elastic strand of substantially constant diameter along its length.
Figure 14:
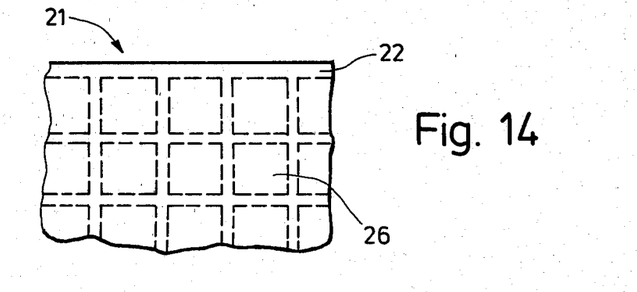
FIG. 14 is a top plan view of a damping member in the form of a plate comprising a plurality of damping platelets.

FIG. 10 illustrates a tire which is provided with channels 18 in the tire material itself near the tread surface. A damping insert 18', or 19, or 20 as shown in FIGS. 11 or 12 or 13 is enclosed in each of the channels or ducts 18. Instead of providing a plurality of individual channels or ducts 18, the tire material may be provided with a slot for receiving a damping plate 21 which is partially shown in FIG. 14. Such damping inserts in the form of strands or plates may also be enclosed in the side walls of the tire. Such enclosure may be accomplished by vulcanizing the damping inserts or plates directly into the tire when the latter is being manufactured. It has been found that the damping platelets 26 as shown in FIG. 14 have the advantage that they are capable of taking up vibrations in the longitudinal direction which is the direction in the circumference of the tire as well as in a direction across the longitudinal direction. Contrary thereto, the damping inserts shown in FIGS. 11, 12, and 13 take up vibrations primarily only in the longitudinal direction. FIG. 11 shows a longitudinal section through a damping insert 18'. Elastic strand elements or sections 23, for example, made of metal wire or textile strands or fibers, are embedded in a damping material 22. These elements 23 have a cross-sectional area S and a circumference U in accordance with the above mentioned formula. The elements 23 are embedded in the damping layer 22 having a shape of approximately rotational symmetry. The damping layer 22 has the thickness H and may be made, for example, of high polymers. The thickness of the damping layer 22 is measured from the surface of the elements 23 outwardly. The insert 18' is preferably provided at its surface with bulges 27 for increasing the surface area to thereby properly anchor the insert 18' in the channels or ducts 18 to provide a force and torque transmitting connection between the material of the tire and the insert. Vibrations traveling in the longitudinal direction of the axis of the inserts 18' are transmitted from the tire material into the damping material 22 by shearing forces. Friction between the damping layer 22 and the elements 23 converts the vibration energy into heat energy whereby the vibrations are substantially damped, particularly if the modulus of shearing of the damping layer 22 is purely imaginary. The entire damping insert 18' may be encased by a protective jacket 28 made, for example, of textile or synthetic material or the like.

FIG. 12 shows a damping insert 19 comprising a continuous elastic fiber or strand 24 which has a varying diameter along its length to provide restrictions 24'. The manufacture of a wire having varying diameters such as shown in FIG. 12 and its encasing in a damping jacket 22 is somewhat easier than the manufacture of the damping insert 18' shown in FIG. 11. However, the damping characteristic of the embodiment shown in FIG. 11 are somewhat better than those of the embodiment shown in FIG. 12.

A further simplification, as far as manufacturing is concerned, is illustrated in FIG. 13 wherein the insert 20 comprises an elastic central strand 25 having a constant diameter along its entire length. The strand 25 of elastic material, such as a metal wire, is embedded or surrounded by the damping layer 22 which is stabilized or protected by a band 29 wound around the outer circumference of the damping layer 22. The band 29 may be a thin textile or synthetic material band or strip.

FIG. 14 shows a top plan view of a portion of a damping plate 21 comprising a plurality of platelets 26 embedded in a damping layer 22. The platelets 26 are symmetrically arranged as shown. Such a damping plate also exhibits excellent damping characteristics relative to vibrations traveling in the plane of the plates. The plate 21 may also be provided with surface increasing elements, such as burrs or bulges.

The invention has been described primarily with reference to tubeless tires. However, it is possible to equip the tubes of ordinary tires in the manner as disclosed herein, so as to provide the vibration absorbers directly in the inner tubes. It has been found that due to the air pressure inside the inner tube, the vibration absorbing means are sufficiently pressed against the inner surfaces of the tire to provide the required force and torque or moment transmission between the tire through the tube to the vibration absorbing means. Thus, the embodiments shown in FIGS. 1-5 may be incorporated in an inner tube.

Although the invention has been described with reference to specific example embodiments, it will be appreciated, that it is intended, to cover all modifications and equivalents within the scope of the appended claims.

What is claimed is:

1. A tire for a wheel, said tire having a tread portion and side wall portions with respective tire rims, comprising vibration absorber means operatively arranged inside said tire, said vibration absorber means being secured in a force and torque transmitting manner to the inside of said tire for reducing the noise radiation of the tire, said vibration absorber means having a cross-sectional shape with a first portion of given thickness and two second portions of diminishing thickness tapering away from said first portion, whereby the mass of the vibration absorber means diminishes from the thicker first portion to the tapering second portion, wherein at least said thicker first portion is secured in said force and said torque transmitting manner to the inside of said tire, and wherein said vibration absorber means have a tubular cross-section with a hollow channel located off-center in said tubular cross section providing said first portion of given thickness resting against an inner surface of the tire, said tubular cross-section further providing said two tapering second portions having tips reaching each other.

2. A tire for a wheel, said tire having a tread portion and said wall portions with respective tire rims, comprising vibration absorber means operatively arranged inside said tire, said vibration absorber means being secured in a force and torque transmitting manner to the inside of said tire for reducing the noise radiation of the tire, said vibration absorber means having a cross-sectional shape with a thicker portion intermdiate two tapering thinner portions, whereby the mass of the vibration absorber means diminishes from the thicker portion to the tapering thinner portions, wherein at least said thicker portion is secured in said force and said torque transmitting manner to the inside of said tire, and wherein said vibration absorber means comprise layers of different densities arranged so that the density decreases radially inwardly with an increasing spacing from the inner tire surface.

3. A tire for a wheel adapted to be filled with a gas, comprising a plurality of separate channel means (18) in the material forming the tire, and a plurality of elongated vibration damping elements, at least one such vibration damping element being operatively held completely enclosed in each of said plurality of separate channel means for damping noise vibrations, each vibration damping element comprising vibration damping embedding material an elongated vibration damping strands, fiber sections or platelets completely embedded in said vibration damping embedding material, and connecting means (27, 29) on the outer surface of said embedding material providing a force and torque transmitting connection between the embedding material and the material forming the tire for transmitting vibrations in the tire material into the damping embedding material so that friction between the embedding material and the vibration damping elements converts said vibrations into heat energy to achieve said noise damping.

4. The tire of claim 3, wherein said connecting means of said embedding damping material comprise an outer surface which increases the outer surface area of said damping embedding material.

5. A tire for a wheel, said tire having a tread portion (1) and side wall portions (2) with respective tire rims (3), comprising vibration absorber means operatively arranged inside said tire, said vibration absorber means being partially secured in a force and torque transmitting manner to the inside of said tire for reducing the noise radiation of the tire, said vibration absorber means having a cross-sectional shape with a first portion (6') of given thickness and two second portions (6") of diminishing thickness tapering away from said first portion, whereby the mass of the vibration absorber means diminishes from the thicker first portion (6') to the tapering second portion (6"), wherein said thicker first portion is secured in said force and said torque transmitting manner to the inside of said tire at said tread portion (1), and wherein the tips of said two tapering portions (6") pointing toward the respective tire rim are connected to the inwardly facing surface of the tire side walls to thereby form two ring shaped air pockets (31) between the tapering second portions and the respective inwardly facing tire surface, so that the entire inwardly facing surface of the vibration absorber means and a substantial proportion of the tire facing surface of the vibration absorber means are directly exposed to the air inside the tire for an efficient noise absorption.

6. A tire for a wheel, said tire having a tread portion and side wall portions with respective tire rims, comprising vibration absorber means operatively arranged inside said tire, said vibration absorber means being secured in a force and torque transmitting manner to the inside of said tire for reducing the noise radiation of the tire, said vibration absorber means having a cross-sectional shape with a first portion (7') of given thickness and two second thicker portions (7") with a thickness tapering toward said first portion, whereby the mass of the vibration absorber means diminishes from the thicker second portions (7") toward the first portion, wherein said first portion (7') is secured in said force and said torque transmitting manner to the inside of said tire, and wherein said second portions (7") are secured to the inner tire surface near the rims (3) to thereby form two ring shaped air pockets (32) between the inner tire surface and the vibration absorber means, so that the entire inwardly facing surface of the vibration absorber means and a substantial proportion of the tire facing surface of the vibration absorber means are directly exposed to the air inside the tire for an efficient noise absorption.

7. A tire for a wheel, said tire having a tread portion and side wall portions with respective tire rims, comprising vibration absorber means operatively arranged inside said tire, said vibration absorber means being secured in a force and torque transmitting manner to the inside of said tire for reducing the noise radiation of the tire, said vibration absorber means having a cross-sectional shape with a thicker portion intermediate two tapering thinner portions, whereby the mass of the vibration absorber means diminishes from the thicker portion of the tapering thinner portions, wherein at least said thicker portion is secured in said force and said torque transmitting manner to the inside of said tire, and wherein said vibration absorber means comprise layers of porous material secured to the inwardly facing surface of the tire, said layers of porous material having porosities which increase from layer to layer radially inwardly with an increasing distance from the inner tire surface.

8. A tire for a wheel, said tire having a tread portion and said wall portions with respective tire rims, comprising vibration absorber means including plate means having a cross-section which diminishes in thickness from one edge toward the opposite edge of the plate means, whereby the mass decreases correspondingly from said one edge to the opposite edge, and wherein said vibration absorber means are secured in a force and torque transmitting manner to an outer surface of the tire side walls at least along the edge or near the edge of larger thickness of said plate means, and wherein said plate means forming the vibration absorbing means comprises a cross-sectional configuration which diminishes radially outwardly so that the narrow end of the plate means points generally in the facing direction of the tire tread, and wherein the wide end of the plate means is secured to the tire near its rim, said plate means having such a stiffness that a spacing between the outer tire side wall and the respective plate means is maintained, except where the plate means is secured to the tire side wall, even at a high r.p.m. of the tire.

9. A tire for a wheel, said tire having a tread portion and side wall portions with respective tire rims, comprising vibration absorber means including plate means having a cross-section which diminishes in thickness from one edge toward the opposite edge, whereby the mass decreases correspondingly from said one edge to the opposite edge, and wherein said vibration absorber means are secured in a force and torque transmitting manner to an outer surface of the tire side walls at least along the edge or near the edge of larger thickness of said plate means, and wherein said plate means forming the vibration absorbing means comprises a cross-sectional configuration which diminishes radially inwardly so that the narrow end of the plate means points substantially toward the tire rim, and wherein the wide end of the plate means is secured to the respective outer tire side wall so as to form a cavity between the outer tire side wall and the respective plate means, said tire further comprising damping layer means in said cavity, said damping layer means being secured to the adjacent tire side wall and to the adjacent plate means.

10. A tire for a wheel, said tire having a tread portion and side wall portions with respective tire rims, comprising vibration absorber means operatively arranged inside or outside said tire, said vibration absorber means being secured in a force and torque transmitting manner to the inside or outside of said tire for reducing the noise radiation of the tire, said vibration absorber means comprising a plurality of relatively flat absorber elements (12, 12', 13, 13') and strap means (14, 14'; 15) secured to the tire, said absorber elements being secured to said strap means to form a vibration absorbing band, and a layer of damping material (16, 17) operatively interposed between said band and the inner or outer tire surface.

11. The tire of claim 10, wherein said absorber elements and said strap mens form an integral structure.

12. The tire of claim 10, wherein said vibration absorber means comprise damping means encased in said vibration absorber means, said damping means comprising a damping layer and elastic fibers, fiber sections, or platelets embedded in said damping layer.

13. The tire of claim 12, wherein said damping layer comprises on its outer surface, bulging elements (27, 29).

* * * * *

UNITED STATES PATENT AND TRADEMARK OFFICE
CERTIFICATE OF CORRECTION

PATENT NO. : 4,399,851

DATED : August 23, 1983

INVENTOR(S) : Oskar Bschorr

It is certified that error appears in the above-identified patent and that said Letters Patent is hereby corrected as shown below:

Col. 8, line 55, claim 2, "intermdiate" should be --intermediate--.
Col. 9, line 5, claim 3, "an" should be --and--.
Col. 10. line 11, claim 7, "of" should be --to--.
Col. 10, line 2, claim 8, "said should be --side--.
Col. 11, line 9, claim 11, "mens" should be --means--.

Signed and Sealed this

Eighteenth Day of October 1983

[SEAL]

Attest:

GERALD J. MOSSINGHOFF

Attesting Officer

Commissioner of Patents and Trademarks